(12) United States Patent
Quandalle

(10) Patent No.: US 12,158,068 B2
(45) Date of Patent: Dec. 3, 2024

(54) GROUND TREATMENT ASSISTANCE METHOD

(71) Applicant: SOLETANCHE FREYSSINET, Rueil Malmaison (FR)

(72) Inventor: Benoit Quandalle, Rueil Malmaison (FR)

(*) Notice: Subject to any disclaimer, the term of this patent is extended or adjusted under 35 U.S.C. 154(b) by 552 days.

(21) Appl. No.: 17/414,381

(22) PCT Filed: Dec. 16, 2019

(86) PCT No.: PCT/FR2019/053086
§ 371 (c)(1),
(2) Date: Jun. 16, 2021

(87) PCT Pub. No.: WO2020/128275
PCT Pub. Date: Jun. 25, 2020

(65) Prior Publication Data
US 2022/0074298 A1    Mar. 10, 2022

(30) Foreign Application Priority Data
Dec. 18, 2018 (FR) ...................................... 18 73143

(51) Int. Cl.
*E21B 47/002* (2012.01)
*G01S 19/07* (2010.01)
(Continued)

(52) U.S. Cl.
CPC ............ *E21B 47/002* (2020.05); *G01S 19/07* (2013.01); *G06T 7/70* (2017.01); *G06T 19/006* (2013.01)

(58) Field of Classification Search
CPC .. E02D 13/06; E02D 7/02; E02D 7/06; E02D 7/08; E02D 7/10; H04M 1/04;
(Continued)

(56) References Cited

U.S. PATENT DOCUMENTS 6,016,455 A * 1/2000 Ohtomo ............... G01C 15/004
356/73
6,427,780 B1 * 8/2002 Kimura .................... G01S 17/74
701/50
(Continued)

FOREIGN PATENT DOCUMENTS

EP    0919837 A2    6/1999
FR    3047311 A1    8/2017
(Continued)

OTHER PUBLICATIONS

English language abstract of JP2003119784.
(Continued)

*Primary Examiner* — Hoa Q Pham
(74) *Attorney, Agent, or Firm* — Brian Gordaychik

(57) ABSTRACT

Ground treatment assistance method comprising providing a machine comprising a ground treatment tool is provided, providing geographic coordinates of at least one treatment area, determining positioning data of the ground treatment tool using an optical acquisition device, displaying at least a first object representative of the ground treatment tool or of said at least one treatment area on a display device, and positioning said first object on the display device using the previously determined positioning data of the ground treatment tool and the geographic coordinates of said treatment area.

20 Claims, 7 Drawing Sheets

(51) Int. Cl.
*G06T 7/70* (2017.01)
*G06T 19/00* (2011.01)

(58) Field of Classification Search
CPC ....... G01C 15/002; G01S 17/06; G01S 17/74; G01S 19/07; E02B 17/0004; E21B 47/002; G06T 7/70; G06T 19/006
USPC ........ 356/141.3, 141.1, 3.09, 4.08, 5.1, 622; 33/90, 4.5, 2; 73/11.03; 38/348, 907; 359/833, 834
See application file for complete search history.

(56) References Cited

U.S. PATENT DOCUMENTS

2016/0122968 A1* 5/2016 Jung .................. E02D 7/02
 405/232
2017/0061605 A1* 3/2017 Nagashima ............... G06T 7/70
2018/0259330 A1 9/2018 Kumagai et al.

FOREIGN PATENT DOCUMENTS

| | | |
|---|---|---|
| JP | H10298991 A | 11/1998 |
| JP | 2003119784 A | 4/2003 |
| JP | 2010230482 A | 10/2010 |
| WO | 2014204308 A1 | 12/2014 |

OTHER PUBLICATIONS

English language abstract of JPH10298991.
English language abstract of JP2010230482.
English language abstract of FR3047311.

* cited by examiner

[Fig. 1]
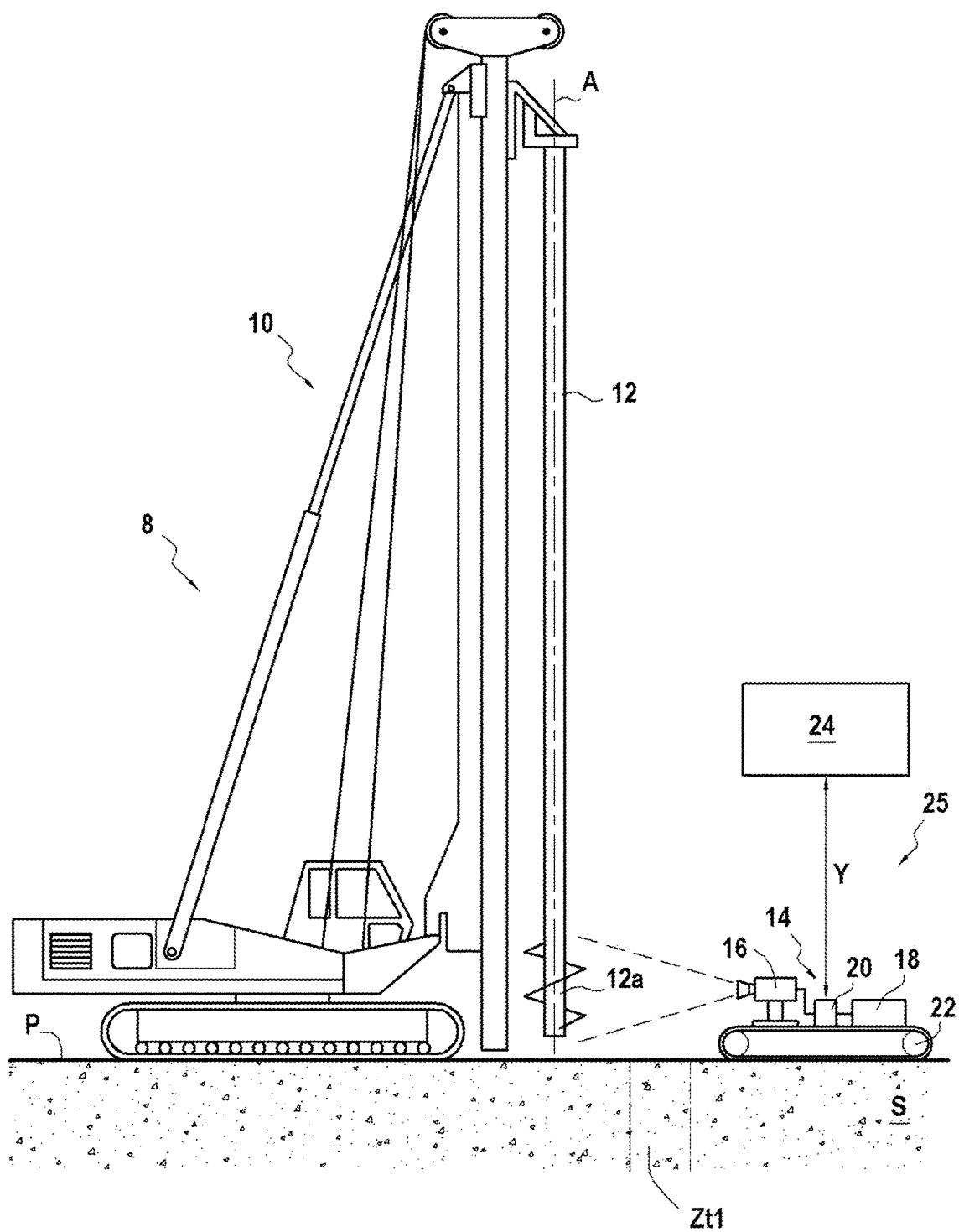

[Fig. 2]
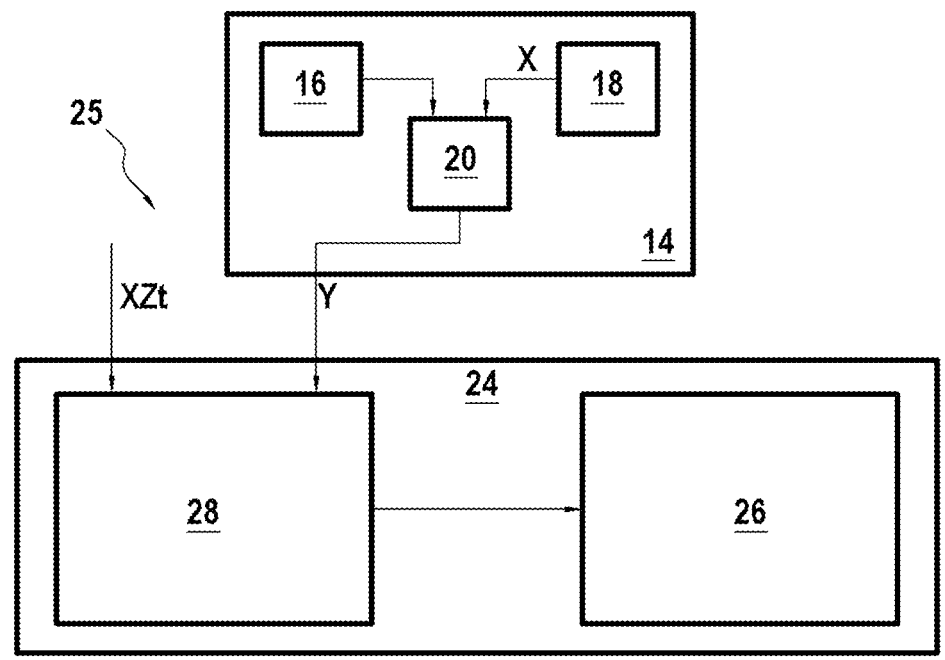
[Fig. 3]
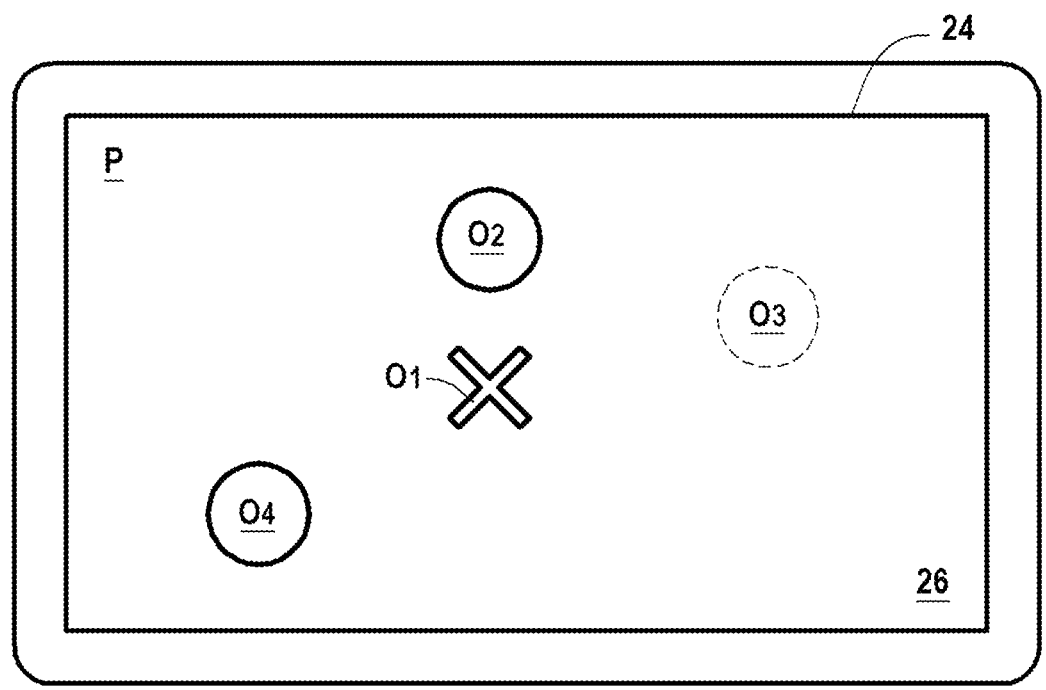

[Fig. 4]
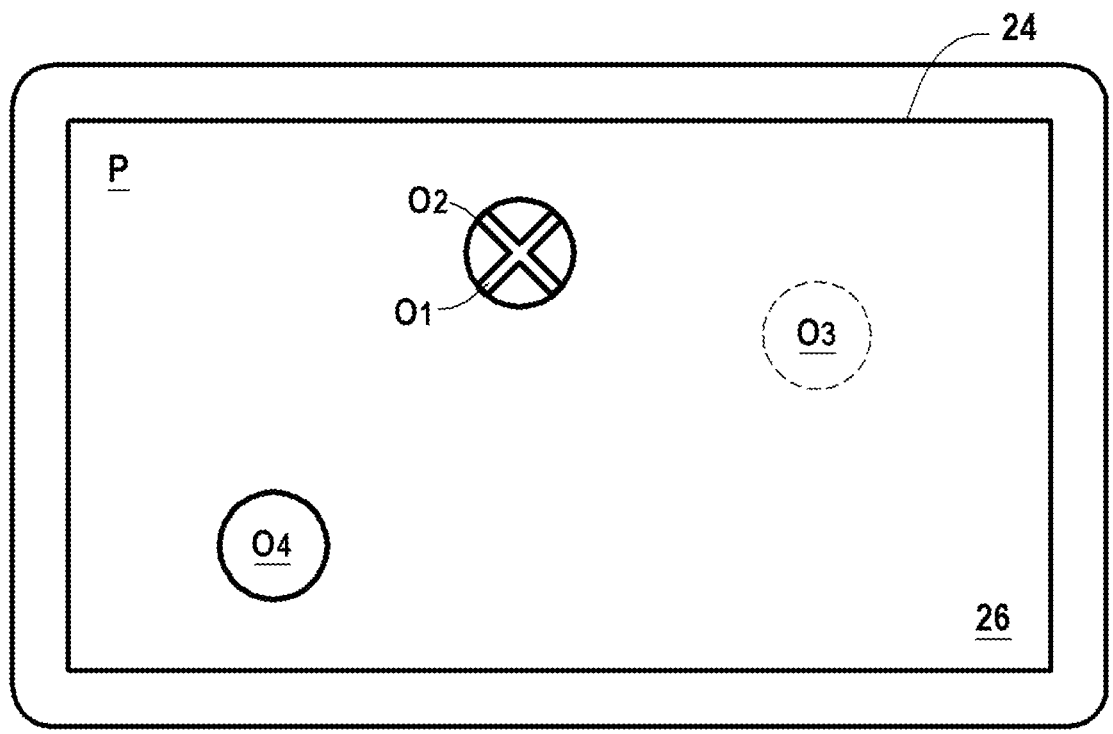

[Fig. 5]
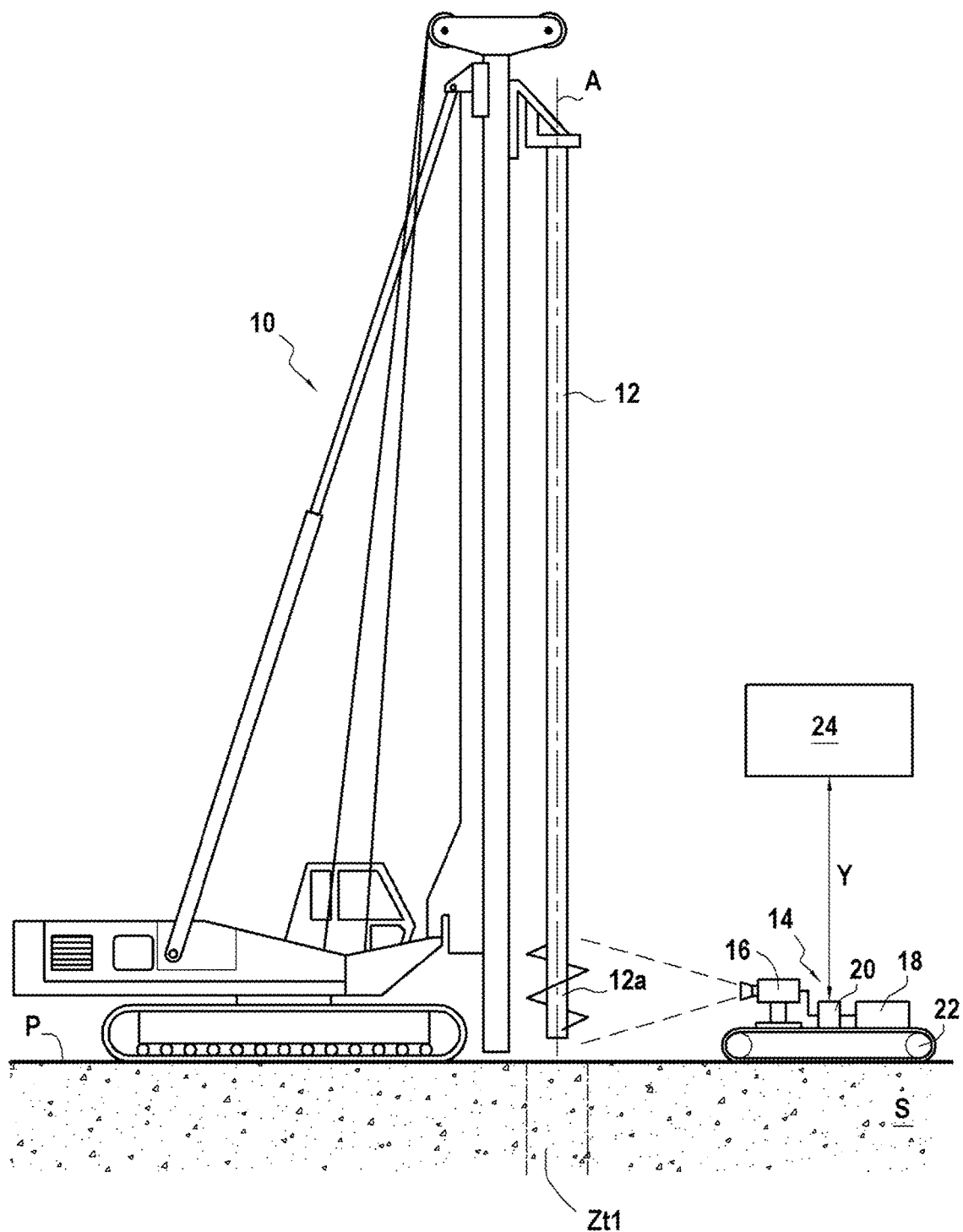

[Fig. 6]
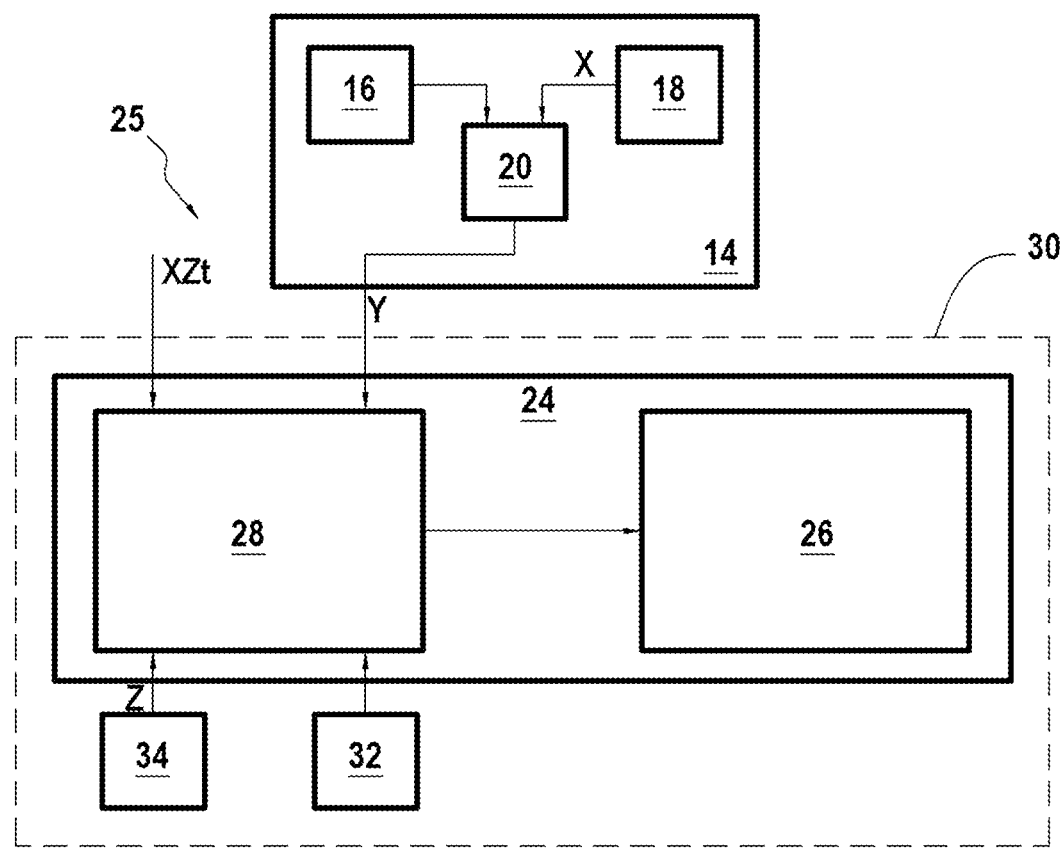

[Fig. 7]
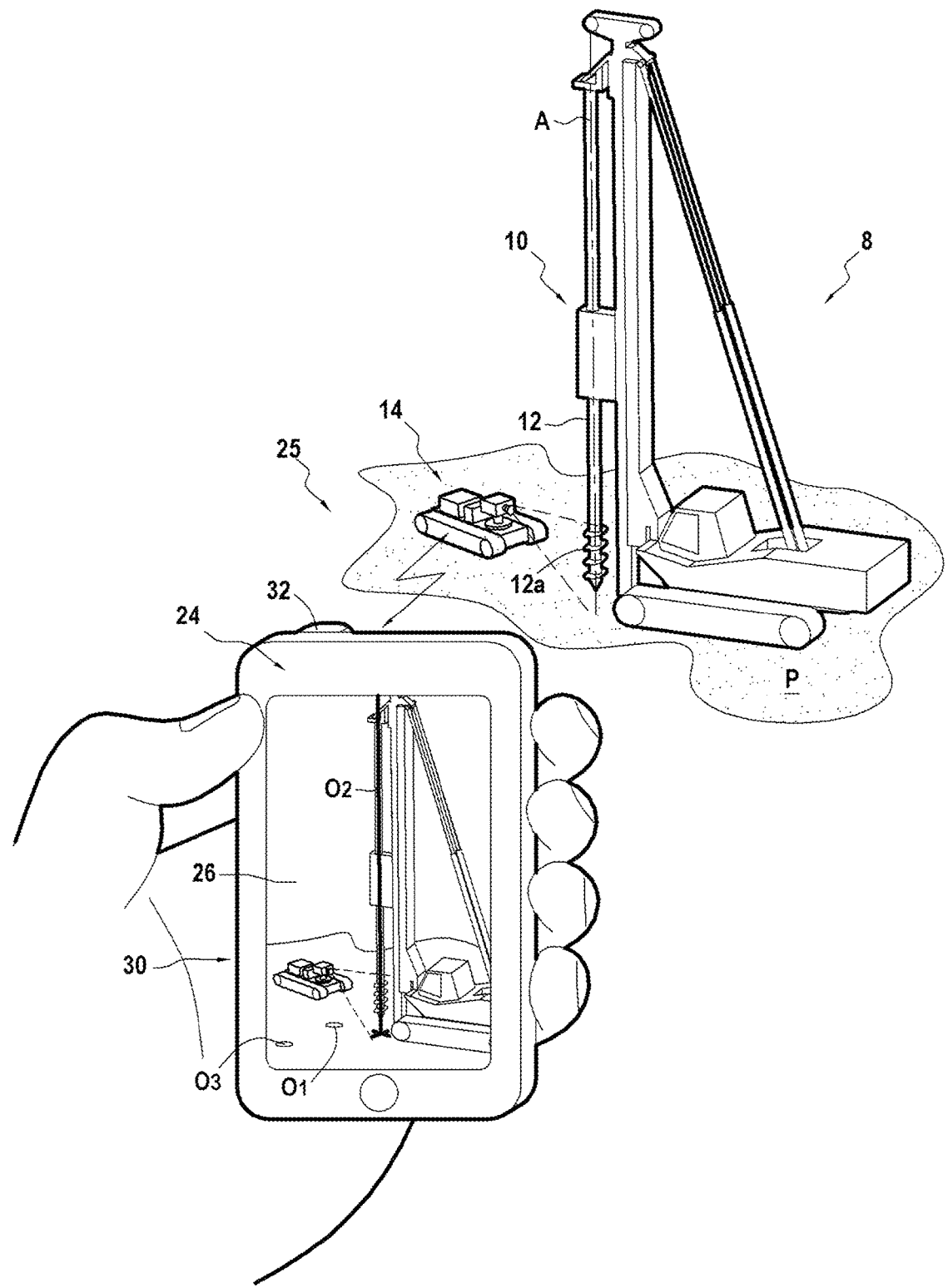

[Fig. 8]
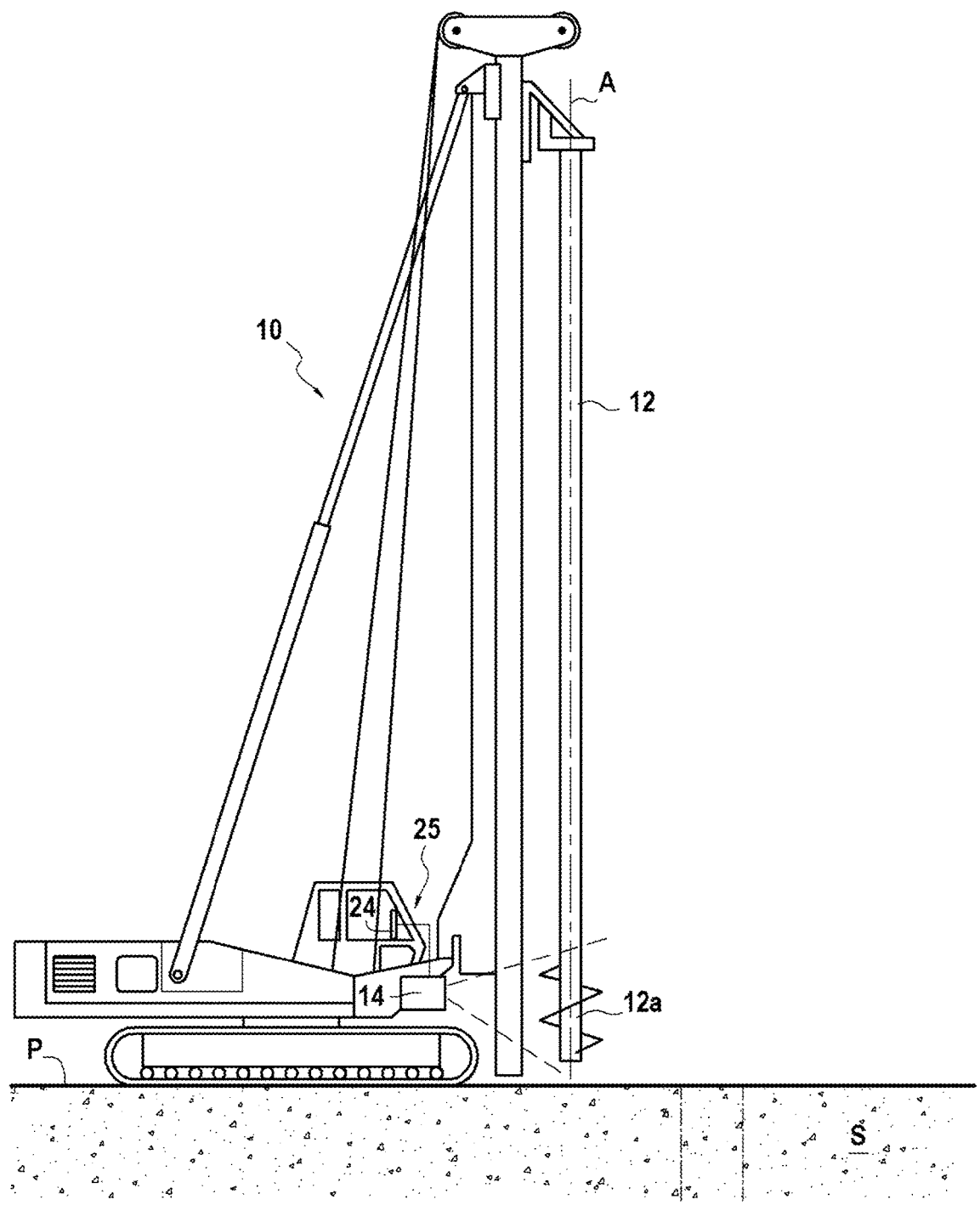

GROUND TREATMENT ASSISTANCE METHOD

TECHNICAL FIELD

The present disclosure relates to the field of ground treatment to improve the physical properties of the ground. The disclosure relates more specifically to a ground treatment assistance method.

Within the framework of ground treatment works, a worksite operator is regularly brought to treat a plurality of distinct ground portions, each having geographic coordinates considered in a global or local reference frame. These ground portions to be treated are called treatment areas.

BACKGROUND

The treatment of a treatment area may for example consist of a drilling of the ground or of the depth-injection of a treatment product at said treatment area. The treatment is carried out using a machine comprising a ground treatment tool intended to be driven into the ground. In other words, the treatment area to be treated can extend to a certain depth.

It is known to provide the worksite operator with a site layout on which the different treatment areas are identified. The operator then seeks to position his machine and his ground treatment tool so as to match the geographic coordinates of the ground treatment tool and those of the drilling area indicated on the site layout. However, the operator does not have a visual indicator on the worksite allowing him to position the ground treatment tool. The operator therefore cannot carry out the ground treatment only from the site layout.

A method is also known which consists in making a marking on the ground of the worksite, for example with paint, so as to indicate the location of the treatment areas to the operator. This method has the drawback of requiring the intervention of a surveyor in order to make the marking from the geographic coordinates of the treatment areas. This method is particularly long and expensive. In addition, such a marking provides final accuracy, after achievement of the treatment of the treatment areas, on the order of ten centimeters, which is again insufficient. In addition, the marking may be erased in the event of rain or traffic on the worksite. To overcome this latter drawback, it is known to materialize the treatment area by a stake or a flag. However, this implies additional costs.

SUMMARY

One aim of the present disclosure is to propose a ground treatment assistance method overcoming the aforementioned problems.

To do so, the present disclosure relates to a ground treatment assistance method comprising the following steps:
  providing a machine comprising a ground treatment tool intended to be introduced into the ground;
  providing geographic coordinates of at least one treatment area associated with a ground treatment to be carried out;
  providing at least one optical acquisition device;
  determining positioning data of the ground treatment tool using the optical acquisition device;
  providing a display device;
  displaying on said display device at least a first object representative of the ground treatment tool or of said at least one treatment area; and
  positioning on the display device said first object using the previously determined positioning data of the ground treatment tool and the geographic coordinates of said treatment area.

The treatment area corresponds to a portion of the worksite ground intended to receive the ground treatment tool. It optionally extends along an axis and is optionally cylindrical. The method according to the present disclosure allows guiding the operator by allowing him to easily and accurately bring the ground treatment tool opposite and above the treatment area.

The positioning data of the ground treatment tool and the geographic coordinates of the treatment area are optionally expressed in the same reference frame. In a non-limiting manner, this reference frame can be a global reference frame, such as the terrestrial reference frame, or a local reference frame, for example centered on an element of the worksite such as a beacon.

The optical acquisition device may comprise one or several photo or video camera(s) or a laser remote-sensing device (LIDAR) configured to acquire images from the ground treatment tool. It can implement image processing or photogrammetry techniques in order to determine the positioning data of the ground treatment tool. The determination of said positioning data can for example be carried out by comparing the different images obtained by the photo or video cameras.

As a variant, the optical acquisition device may comprise a laser and a reflective target disposed on the ground treatment tool. By pointing the laser at the target, positioning data of said target and therefore of the ground treatment tool are then determined.

Optionally, the acquisition of the positioning data is carried out at the base of the ground treatment tool. Furthermore, the optical acquisition device is optionally disposed in the vicinity of said base of the ground treatment tool. The distance between the optical acquisition device and the base of the ground treatment tool is for example comprised between 1 meter and 5 meters.

Unlike the methods of the prior art which do not allow accurate identification of the position of the treatment tool, the method according to the present disclosure allows acquiring the positioning data by making measurements directly on the ground treatment tool. Indeed, the optical acquisition device allows acquiring the local environment at the base of the mast. The risk of measurement errors and inaccuracies is greatly reduced. Also, the determination of the positioning data of the ground treatment tool is facilitated and the accuracy of the determined positioning data is improved.

The positioning data of the ground treatment tool are optionally determined and updated in real time and directly transmitted to the display device.

In a non-limiting manner, the optical acquisition device can be mounted on the machine or on a carrier, optionally a movable carrier, independent of the machine. This carrier can be an autonomous vehicle configured to move around the worksite.

The display device optionally comprises a screen, configured to display the first object and a video monitoring module communicating with the screen to position the first object on the screen. In a non-limiting manner, the display device can equip an apparatus such as a touch pad, a smartphone, a portable computer or a pair of augmented reality glasses. Also, the method according to the present disclosure is optionally implemented in such an apparatus.

The positioning data of the ground treatment tool, determined by the optical acquisition device, are optionally provided to the video monitoring module of the display device. These positioning data are processed by the video monitoring device which uses these positioning data to place and position the first object on the screen.

Without departing from the framework of the present disclosure, and in a non-limiting manner, it is possible to display on the display device only a first object representative of the ground treatment tool, only a first object representative of the treatment area or first and second objects representative respectively of the treatment area and of the ground treatment tool, or vice versa.

In the variants where the first object is representative of the ground treatment tool, the positioning data of said tool allow directly deducing the position of the first object on the display device, which allows positioning the first object representative of the ground treatment tool on the display device. One advantage of this variant may be to visualize the position of the ground treatment tool, which may be useful in the event that the operator is unable to see it directly. For example, the operator can check the display device if the ground treatment tool is concealed by the treatment machine.

In the variants where the first object is representative of the treatment area, the positioning data of the ground treatment tool are used as references to position the first object on the display device. The position of the first object representative of the treatment area on the display device is therefore also a function of the positioning data of the ground treatment tool.

Even if no object representative of the ground treatment tool is displayed, the positioning data of the latter are optionally used to correctly position the first object representative of the treatment area on the display device. The object representative of the treatment area is positioned relative to the position that an object representative of the ground treatment tool would have if it were displayed.

One advantage of this variant may be to indicate to the operator the position of the treatment area so that he can position the ground treatment tool opposite said area. The display device then allows guiding the operator in order to position the ground treatment tool opposite the treatment area so as to be able to treat it. It is then possible to dispense with the marking of the treatment area directly on the ground. Furthermore, it is then not necessary to require the intervention of a surveyor to define the site of each treatment area, which reduces the costs incurred and the time required to start the treatment. Furthermore, this display allows avoiding the risk of erasing the marking on the ground and improves the accuracy of the indication given to the operator.

Thanks to the disclosed subject-matter, insofar as the positioning data of the ground treatment tool are determined with accuracy by the optical acquisition device, said first object may be positioned accurately on the display device, which may allow treating the treatment area accurately.

Furthermore, thanks to the disclosed subject-matter, the operator may be able to easily and quickly be informed of the position of the treatment area and/or of the ground treatment tool.

The first object can present different graphical representations. It can have the shape of a symbol with simple geometry, such as a circle or a cross. A first object representative of the ground treatment tool can also be an accurate or schematic image of said ground treatment tool. The first object allows indicating to the operator where the ground treatment tool or the treatment area is located.

Without departing from the framework of the present disclosure, additional information can be displayed on the display device, for example in text form. For example, it is possible to display data relating to the treatment area, such as its dimensions, its coordinates, or data relating to the treatment to be carried out.

Optionally, the position of the first object on the display device is updated in real time, whereby the operator is continuously guided. As a result, when the user moves the ground treatment tool, the display and for example the position of the first object on the display device are updated. This facilitates the maneuvers of moving the ground treatment tool in order to place it opposite the treatment area.

Optionally, the positioning data of the ground treatment tool comprise at least the geographic coordinates of said ground treatment tool. Said coordinates can be expressed in a global or local reference frame. They can be expressed in a plane or in space. The position of the first object on the display device is a function of said geographic coordinates.

Optionally, the positioning data of the ground treatment tool can also comprise an orientation vector of said ground treatment tool. In the variant where the first object is representative of the ground treatment tool, the determination of the orientation vector of the ground treatment tool can also allow orienting the first object displayed on the display device.

According to an optional aspect of the present disclosure, the step of determining the positioning data of the ground treatment tool comprises a step of recognizing the shape of the ground treatment tool. One advantage may be to identify the ground treatment tool and to accurately deduce therefrom its positioning data. The recognition step optionally includes a step of analyzing the characteristic shape of the ground treatment tool and a step of comparing this shape with characteristic shapes. This comparison allows deducing therefrom the positioning data of the ground treatment tool.

The step of recognizing the shape of the treatment tool optionally implements a recognition algorithm of the machine learning algorithm type.

Optionally, the ground treatment tool extends along an axis, the positioning data of the ground treatment tool are positioning data of said axis of the ground treatment tool, and the first object is representative of the axis of the ground treatment tool. The representation of the axis of the ground treatment tool provides readability and accuracy on the display device, which facilitates the positioning of the ground treatment tool opposite the treatment area.

The ground treatment tool is optionally, but without limitation, pivoting about this axis.

Optionally, positioning data of the optical acquisition device are provided and the first object is positioned on the display device also using the positioning data of the optical acquisition device. One advantage may be to accurately determine the positioning data of the ground treatment tool and to accurately position the first object on the display device with respect to the positioning data of the optical acquisition device.

Without limitation, the optical acquisition device can be fixed on the worksite, so that its positioning data are known and do not vary over time. It is then not necessary to determine or update them.

Optionally, the optical acquisition device is mounted on the machine, the method further comprising a step in which the positioning data of the optical acquisition device are determined. In this optional variant, the optical acquisition device is movable with the machine. Also, it is appropriate to determine, optionally in real time, its positioning data, so as to update them before positioning the first object on the display device using said positioning data of the optical acquisition device.

Optionally, the positioning data of the optical acquisition device comprise the geographic coordinates, the orientation and/or the inclination of said optical acquisition device.

The geographic coordinates are optionally expressed in the terrestrial reference frame and comprise the latitude, the longitude and possibly the altitude of the optical acquisition device.

Optionally, the geographic coordinates of the optical acquisition device are determined using a geolocation member, for example a GPS system. Such a geolocation member allows knowing accurately and in real time the geographic coordinates of the optical acquisition device. The geolocation member can also consist of a GPS system and an inertial unit.

As a variant, the geographic coordinates of the optical acquisition device can be determined relative to an element of the worksite, such as a beacon. This determination can be implemented using a laser remote-sensing system or LIDAR.

According to an optional aspect of the present disclosure, at least a second object representative of the ground treatment tool is displayed on the display device if the first object is representative of the treatment area or of the treatment area if the first object is representative of the ground treatment tool. It is therefore understood that one object represents the ground treatment tool while another object represents the treatment area. This display allows the user to visualize the relative position of the treatment area and of the ground treatment tool.

By observing the display device, the operator is quickly and accurately informed of the position of the ground treatment tool in order to bring it to the final position for starting the treatment.

Optionally, a step of moving the ground treatment tool parallel to the ground is performed, so as to position the object representative of the ground treatment tool with respect to the object representative of the treatment area. Optionally, and in a non-limiting manner, the object representative of the treatment tool is fixed on the display device, while the object representative of the treatment area is movable on said display device.

The operator can move the ground treatment tool and observe the relative movement of the associated object with respect to the object representative of the treatment area on the display device. It can then match the object representative of the ground treatment tool and the object representative of the treatment area before starting the treatment of said treatment area.

The operator can for example seek to superimpose the two objects.

In a non-limiting manner, the two objects can present different, possibly complementary, graphical representations in order to facilitate their positioning with respect to each other. For example, the object representative of the treatment area may have the shape of a circle while the object representative of the ground treatment tool may have the shape of a cross. The operator can then move the ground treatment tool until said cross is positioned inside the circle.

In a non-limiting manner, the worksite can have a plurality of treatment areas and the display device is configured to display for each treatment area, an object representative of said treatment area.

According to a first optional variant, the display on the display device is representative of a horizontal plane, the first object being representative of the vertical projection of the ground treatment tool in said horizontal plane and the second object being representative of the vertical projection of the treatment area in said horizontal plane. The display is therefore a two-dimensional display and the first and second objects are positioned and move relatively with respect to each other in said horizontal plane. The display optionally corresponds to a top view of the worksite ground layout.

One advantage may be to facilitate the visualization for the operator. Indeed, in this embodiment, the display of the worksite on the display device is close to the representation of said worksite on a traditional layout or map. A movement of the ground treatment tool parallel to the ground optionally causes a movement of the object representative of the ground treatment tool on the screen.

The operator can easily identify the relative position of the treatment area and of the ground treatment tool from the two-dimensional objects. The operator is effectively guided in the movement of the ground treatment tool. For example, the operator can move the ground treatment tool until the objects representative of the ground treatment tool and the treatment area are superimposed. In a non-limiting manner, the operator can position the ground treatment tool by locating himself on the display device. The positioning of the ground treatment tool can be carried out even when the treatment area or the ground treatment tool is not visible to the operator.

According to a second optional variant, the first object is representative of the treatment area and the following steps are further performed:
  providing at least one augmented reality device comprising said display device and an image acquisition device;
  acquiring images using the image acquisition device and displaying said images on the display device;
  determining positioning data of the image acquisition device;
  when the image acquisition device is oriented towards the treatment area, embedding in the images displayed on the display device said first object representative of the treatment area, said first object being positioned on the display device further using the positioning data of the image acquisition device, so that said first object representative of the treatment area coincides with the treatment area displayed on the display device.

In a non-limiting manner, the augmented reality device can comprise a smartphone, a touch pad or a pair of augmented reality glasses. The display device optionally comprises a screen constituting the screen of the augmented reality device, for example the lenses of the augmented reality glasses or the screen of the smartphone.

The image acquisition device may comprise a photo or a video camera fitted to the augmented reality device. The image acquisition device allows acquiring in real-time images of the worksite that are simultaneously displayed on the display device. When the image acquisition device is oriented towards the treatment area, said treatment area is displayed on the display device.

The positioning data of the image acquisition device optionally comprise the geographic coordinates of the image acquisition device as well as its orientation in a horizontal plane and its inclination with respect to a vertical plane.

The determination of the positioning data of the image acquisition device allows correctly positioning the first object representative of the treatment area on the display device so that the latter is accurately superimposed with the displayed treatment area. The augmented reality device is optionally provided with one or several element(s) taken from a GPS, an inclinometer, a gyroscope and an inclinometer.

One advantage may be to provide the user with an augmented reality environment allowing him to quickly, easily and accurately visualize the accurate position of the treatment area. This allows dispensing with the ground marking of the treatment area. Furthermore, in this embodiment, the user can place the augmented reality device in his field of vision and jointly visualize the image of the worksite and the first object. He is not required to switch his gaze between the worksite and a layout or a remote screen. The full attention of the operator is therefore focused on the worksite environment, which reduces the risks of accidents.

The display and the position of the first object on the display device are optionally updated in real time, so that they are updated during the movement of the augmented reality device. The display on the display device is therefore dynamic and depends on the orientation and on the position adopted by the augmented reality device.

It is understood that, in this non-limiting variant, the optical acquisition device is configured to accurately determine the positioning data of the ground treatment tool in order to accurately position the first object on the display device. The optical acquisition device for example allows determining positioning data of the ground treatment tool which are more accurate when it is disposed in the vicinity of the ground treatment tool. As a variant and without limitation, the first object may be representative of the ground treatment tool. One advantage may be to allow the operator to accurately visualize the position of said ground treatment tool, for example when the latter is not visible to the operator from his position, such as when the ground treatment tool is concealed by the machine.

Optionally, said at least one first object presents a graphical representation which depends on the state of progress of the treatment. For example, the shape or the color of the first object may vary depending on whether the treatment area is "treated", that is to say depending on whether the treatment "has already been carried out", "is being carried out", or "is to be carried out". One advantage may be to quickly provide the operator with information on the next actions to be taken and possibly on the next area to be treated.

Optionally, the distance between the ground treatment tool and the treatment area is calculated using the positioning data of the ground treatment tool and the geographic coordinates of the treatment area, and said at least one first object presents a graphical representation which is a function of said calculated distance. For example, the color of the first object may change when the ground treatment tool approaches the treatment area. One advantage may be to assist the operator more effectively.

In addition, in the case where several objects, each representative of a treatment area, are displayed, the object representative of the treatment area closest to the ground treatment tool may present a graphical representation different from that of the other objects. One advantage may be to indicate to the operator the treatment area closest to his tool in order to make him treat this treatment area firstly. This allows reducing the times of movement of the ground treatment tool between treatment areas.

Optionally, the ground treatment is a ground drilling, the ground treatment tool is a drilling tool and the treatment area is a drilling area. Such a drilling can allow making inclusions or piles in the ground.

Optionally, and in a non-limiting manner, the drilling tool is rotatable about an axis, the step of determining the positioning data of the drilling tool being performed while the drilling tool is being rotated about said axis, and the first object being representative of the axis of the drilling tool.

Without departing from the framework of the present disclosure, the drilling tool can be movable in translation along said axis and/or rotatable about said axis. As a variant and without limitation, the second object can be representative of the axis of the drilling tool.

The present disclosure also relates to a ground treatment assistance device, said ground comprising at least one treatment area associated with a treatment to be carried out on the ground, the device comprising:
  at least one optical acquisition device configured to determine positioning data of the ground treatment tool; and
  a display device configured to display at least a first object representative of the ground treatment tool or of said treatment area, said first object being positioned on the display device using the first determined positioning data of said axis of the ground treatment tool and the geographic coordinates of said treatment area.

The present disclosure also relates to a ground treatment installation including:
  a ground treatment machine comprising a ground treatment tool; and
  a ground treatment assistance device according to the present disclosure.

Optionally, but without limitation, the optical acquisition device is mounted on the ground treatment machine.

BRIEF DESCRIPTION OF THE DRAWINGS

The present disclosure will be better understood upon reading the following description of embodiments of the present disclosure given by way of non-limiting examples, with reference to the appended drawings, in which:

FIG. 1 illustrates a ground treatment installation according to the present disclosure comprising a first embodiment of a ground treatment assistance device;

FIG. 2 illustrates the ground treatment assistance device of the ground treatment installation of FIG. 1;

FIG. 3 illustrates the display device of the ground treatment assistance device of FIG. 2;

FIG. 4 illustrates the display device of FIG. 3 after positioning of the ground treatment tool;

FIG. 5 illustrates the ground treatment installation of FIG. 1 after positioning of the ground treatment tool;

FIG. 6 illustrates a second embodiment of a ground treatment assistance device according to the present disclosure;

FIG. 7 illustrates a ground treatment installation equipped with the ground treatment assistance device of FIG. 6; and FIG. 8 illustrates one variant of the ground treatment installation of FIG. 1.

DESCRIPTION OF THE EMBODIMENTS

The present disclosure relates to a ground treatment assistance method. This method allows guiding an operator through the treatment of one or several ground portion(s), forming treatment areas, using a ground treatment tool.

FIGS. 1 to 5 describe a first embodiment of the ground treatment assistance method on a worksite, in accordance with the present disclosure. This method is implemented using a treatment assistance device. In this example, the ground comprises a plurality of ground portions to be treated, called treatment areas. For example, the ground comprises a first, a second and a third treatment area. In FIG. 1, only the first treatment area Zt1 is represented.

FIG. 1 illustrates a ground treatment installation 8 according to the present disclosure. In accordance with the method according to the present disclosure, a treatment machine 10 comprising a ground treatment tool 12 with a base 12a is provided. This ground treatment tool 12 is intended to be introduced into a ground S so as to treat one or several treatment area(s). In this non-limiting example, the ground treatment tool 12 is a drilling tool configured to drill the treatment area(s). Consequently, the treatment areas constitute drilling areas. It is optionally but without limitation cylindrical. In this non-limiting example, the ground treatment tool is rotatable about an axis A and movable in translation along said axis A. As a variant, it could only be movable in translation.

The geographic coordinates XZt of the treatment areas are known and provided. They can be expressed in a global reference frame, for example the terrestrial reference frame, or in a local reference frame, centered on an element of the worksite such as a beacon.

An optical acquisition device 14 is further provided. In this non-limiting example, the optical acquisition device 14 comprises a video camera 16 as well as a GPS system 18 that allows determining positioning data X of the optical acquisition device 14. The GPS system 18 constitutes a member for geolocating said optical acquisition device 14. The positioning data X of the optical acquisition device 14 comprise, in this non-limiting example, the geographic coordinates and an orientation vector of the optical acquisition device 14.

The optical acquisition device further comprises a computer 20 communicating with the video camera 16 and with the GPS system 18. The optical acquisition device 14 is mounted on a movable autonomous vehicle 22. Also, the optical acquisition device 14 can be moved around the worksite.

The optical acquisition device 14 is configured to acquire images of the base 12a of the treatment tool 12 using the video camera 16. It is optionally positioned in the vicinity of the base 12a of the treatment tool.

As can be seen in FIG. 1, the optical acquisition device 14 and for example the computer 20 communicate with a display device 24. In a non-limiting manner, the communication is achieved via Bluetooth or Wi-Fi type wireless communication means.

The display device 24 can be integrated into a smartphone, a touch pad, or an augmented reality device such as augmented reality glasses.

The assembly formed by the display device 24 and the optical acquisition device 14 forms a treatment assistance device 25 illustrated in FIG. 2. The installation 8 comprises said treatment assistance device 25 and the machine 10 equipped with the treatment tool 12.

As can be seen in this FIG. 2, the display device 24 comprises, without limitation, a screen 26 and a video monitoring module 28 communicating with the screen 26. The video monitoring module 28 is configured to monitor the display on the screen 26 of the display device 24.

In accordance with the ground treatment assistance method according to the present disclosure, positioning data Y of the ground treatment tool 12 are firstly determined using the optical acquisition device 14. In this non-limiting example, the positioning data Y of the ground treatment tool comprise the geographic coordinates of said ground treatment tool 12. These geographic coordinates correspond to the geographic coordinates of the axis A of the ground treatment tool 12. They can be expressed in a global or local reference frame and are optionally expressed in the same reference frame as the geographic coordinates of the optical acquisition device 14.

As can be seen in FIG. 1, the optical acquisition device 14 is brought in the vicinity of the base 12a of the ground treatment tool 12 using the autonomous vehicle 22. The video camera 16 of the optical acquisition device films the base 12a of the ground treatment tool 12. Without departing from the framework of the present disclosure, the optical acquisition device 14 could comprise a plurality of cameras configured to film the base of the ground treatment tool from different angles. The images acquired by the video camera 16 of the optical acquisition device 14 are transmitted to the computer 20.

In order to determine the positioning coordinates of the ground treatment tool 12, a step of recognizing the shape of the ground treatment tool 12 is then performed. To do so, in a non-limiting manner, the computer 20 performs a step of analyzing the characteristic shape of the ground treatment tool 12, from the images transmitted by the video camera 16 and a step of comparing this shape with characteristic shapes, for example stored in an internal memory.

The recognition of the shape of the ground treatment tool 12 allows the computer 20 of the optical acquisition device to determine the positioning data Y of the ground treatment tool 12.

In parallel, the GPS system 18 transmits in real time the determined positioning data X of the optical acquisition device 14 to the computer 20. Also, in this non-limiting example, the determined positioning data X of the optical acquisition device 14 are also used to determine the positioning data Y of the ground treatment tool 12.

The use of an optical acquisition device 14 according to the present disclosure allows determining very accurately the positioning data of the ground treatment tool.

In addition, said positioning data Y of the ground treatment tool are updated in real time. Also, a movement of the ground treatment tool 12 causes a modification of said positioning data Y of the ground treatment tool 12.

The positioning data Y of the ground treatment tool 12 are then transmitted from the computer 20 to the video monitoring module 28 of the display device 24.

The geographic coordinates XZt of the treatment areas are also provided. In this example, these geographic coordinates XZt are provided to the video monitoring module 28.

The video monitoring module 28 then controls the display on the screen 26 of the display device 24. For example, it is configured to display and position different objects on the screen 26.

In this first implementation of the method according to the present disclosure, and as illustrated in FIG. 3, the display device 24 is integrated into a touch pad. The screen 26 therefore forms a screen of said touch pad. It is configured to display a two-dimensional plane of the worksite, in top view. The display is therefore representative of a horizontal plane substantially parallel to the worksite ground.

In this non-limiting example, a first object $O_1$ representative of the axis A of the ground treatment tool 12 is furthermore displayed on the screen 26 of the display device. This first object $O_1$ has a cross as a graphical representation and is movable on the screen 26. It represents a vertical projection of the ground treatment tool on the horizontal plane P.

Second $O_2$, third $O_3$ and fourth $O_4$ objects representative respectively of distinct first treatment area Zt1, second treatment area and third treatment area are furthermore displayed. Only the first treatment area Zt1 is visible in FIG. 1. The second $O_2$, third $O_3$ and fourth $O_4$ objects present a graphical representation in the form of a circle and are in a non-limiting manner fixed on the screen. The second $O_2$, third $O_3$ and fourth $O_4$ objects are representative of a projection of the treatment areas in the horizontal plane P.

Said objects $O_1$, $O_2$, $O_3$, $O_4$ are then positioned on the screen 26 based on the previously determined positioning data Y of the ground treatment tool 12 and on the geographic coordinates XZt of the treatment areas. The displaying and the positioning of these objects on the screen 26 are carried out by the video monitoring module 28.

The position on the screen 26 of the first object $O_1$ representative of the ground treatment tool 12 is deduced directly from the positioning data Y and for example, in this non-limiting example, from the determined geographic coordinates of the ground treatment tool 12. The geographic coordinates of the ground treatment tool are transposed into coordinates of the first object on the screen.

The position on the screen of the second $O_2$, third $O_3$ and fourth $O_4$ objects is also determined based on the positioning data Y and, for example on the determined geographic coordinates of the ground treatment tool 12. Indeed, the positioning data Y of the ground treatment tool 12 are used as references to position the objects representative of the treatment areas on the screen. In other words, the position on the screen of the second $O_2$, third $O_3$ and fourth $O_4$ objects is a function of the position on the screen 26 of the first object $O_1$. The positioning data Y of the ground treatment tool 12 are also used to orient the display of said objects on the screen, for example according to the direction of movement of the treatment machine.

One advantage of using the ground treatment tool 12 and its positioning data as a reference to position the objects on the screen may be to position them more accurately while limiting the risks of inaccuracies in the positioning of the different objects on the screen.

In this non-limiting example, the second $O_2$ and fourth $O_4$ objects are represented in solid lines so as to indicate that the first and third treatment areas are "to be treated". The third object is represented in dotted lines so as to indicate that the second treatment area is already "treated".

The position of the first object $O_1$ representative of the ground treatment tool 12 on the screen 26 is updated in real time. Also, a modification of the positioning data Y of the ground treatment tool causes a modification of the position of the first object $O_1$ on the screen 26.

When the operator moves the ground treatment tool 12 in the horizontal plane with respect to the ground S, the positioning data Y of said ground treatment tool 12 are modified and the first object $O_1$ is moved on the screen.

Consequently, the operator can move the ground treatment tool 12 horizontally, for example by moving the machine, and simultaneously check the screen 26 of the display device 24 in order to visualize the relative position of the first object $O_1$ with respect to the objects $O_2$, $O_3$, $O_4$ representative of the treatment areas.

As a variant, and without limitation, the first object $O_1$ could be fixed on the screen while the objects $O_2$, $O_3$, $O_4$ representative of the treatment areas move, depending on the movement of the ground treatment tool 12.

In this way, the operator is guided in the movement of the ground treatment tool 12 on the worksite and for example towards the treatment areas. The optical acquisition device is optionally moved so as to keep the distance between the video camera 16 and the treatment tool 12 substantially constant.

As illustrated by the passage from FIG. 3 to FIG. 4, the operator can for example move the ground treatment tool 12 until the first object $O_1$ representative of the ground treatment tool 12 coincides with the second object $O_2$ representative of the first treatment area Zt1. This is reflected by the cross extending inside the circle.

Therefore, insofar as the positioning data Y of the ground treatment tool have been determined with accuracy thanks to the optical acquisition device 14, and insofar as the objects are positioned on the screen of the display device using these positioning data Y, the ground treatment tool 12 is then disposed accurately opposite the first treatment area Zt1. In other words, and as can be seen in FIG. 5, the geographic coordinates of the ground treatment tool are then identical to the geographic coordinates of the first treatment area Zt1. In addition, the first treatment area Zt1 extends along an axis which is then substantially coincident with the axis A of the ground treatment tool.

The operator can proceed with the treatment of the first treatment area Zt1 by introducing the ground treatment tool 12 into the ground S, by vertical movement downwards. The treatment in this example consists in the drilling of the first treatment area Zt1.

FIGS. 6 and 7 illustrate a second implementation of the ground treatment method according to the present disclosure using a ground treatment device 25. In this non-limiting example, an augmented reality device 30 is provided comprising a display device 24 as described above and an image acquisition device 32. The augmented reality device 30 comprises a smartphone while the image acquisition device 32 comprises a video camera fitted to the smartphone. Without departing from the framework of the present disclosure, the augmented reality device 30 could be a pair of augmented reality glasses. The image acquisition device 32 is configured to acquire images, for example of the worksite.

The augmented reality device 30 also comprises, in a conventional manner, a positioning device 34, for example a GPS, that allows determining positioning data Z of the image acquisition device 32. These positioning data Z comprise for example the geographic coordinates of the image acquisition device 32 as well as its orientation in the horizontal plane P and its inclination with respect to a vertical plane.

As previously, the display device comprises a screen 26 and a video monitoring module 28. Furthermore, the ground treatment assistance device 25 comprises the augmented reality device 30 and an optical acquisition device 14 as described above.

This second mode of implementation of the ground treatment assistance method using this ground treatment assistance device 25 will now be described in more detail.

As can be seen in FIG. 7, when the operator positions the augmented reality device 30 so that the image acquisition device 32 films the worksite, the image of part of the worksite is displayed on the screen 26 of the display device 24. An image acquisition step followed by an image display step is therefore performed.

The positioning data Z of the image acquisition device is then determined using the positioning module 34.

In FIG. 7, it is noticed that the machine 10, the ground treatment tool 12 and part of the ground S are in the field of view of the image acquisition device 32, so that an image of them is displayed on the screen 26 of the display device 24 of the augmented reality device 30.

In this non-limiting example, the video monitoring module 28 is then configured to embed in the images displayed on the screen 26 of the first object $O_1'$ and third object $O_3'$ representative respectively of a first treatment area and a second treatment area as well as a second object $O_2'$ representative of the ground treatment tool 12. Said second object $O_2'$ is for example representative of the axis A of the ground treatment tool 12. The second object $O_2'$ consists of a straight line and further includes, without limitation, a cross at its lower end representing the intersection of the axis of the ground treatment tool with the horizontal plane P of the worksite ground. The first and third objects $O_1'$, $O_3'$ have the shape of circles therefore the inclination varies depending on the orientation of the augmented reality device 30.

Said objects $O_1'$, $O_2'$, $O_3'$ are positioned on the screen 26 of the display device 24 using the video monitoring module 28 of the display device, based on the positioning data Z of the image acquisition device, previously determined using the positioning module 34, as well as on the positioning data Y of the ground treatment tool 12. The positioning data Y of the ground treatment tool 12 are determined as above by the optical acquisition device 14. This determination optionally implements a step of recognizing the shape of the treatment tool.

The first and third objects are furthermore positioned using known geographic coordinates of the treatment areas.

The second object $O_2'$ is positioned so as to coincide with the ground treatment tool 12. The second object appears to be coincident with the axis A of the ground treatment tool. The first and third objects $O_1'$, $O_3'$ are positioned so as to coincide with the treatment areas displayed on the screen 26. They appear positioned in the ground layout.

The optical acquisition device 14 being disposed in the vicinity of the base 12a of the ground treatment tool 12, it allows determining accurately the positioning data Y of the ground treatment tool. The use of such an optical acquisition device 14 according to the present disclosure allows improving the accuracy of the positioning of the objects embedded on the screen compared to the systems of the prior art.

It is understood that thanks to the disclosed subject-matter, the operator can easily and quickly know where the treatment areas and the ground treatment tool are located and visualize the relative position of the ground treatment tool 12 with respect to said treatment areas. It is not necessary to make a marking on the ground or to require the intervention of a surveyor to locate the treatment areas.

In this non-limiting example, the video monitoring module 28 can calculate the distance between the ground treatment tool 12 and respectively the first and second treatment areas and compare these distances. It can then display the first object $O_1'$ in a different color from that of the third object $O_3'$, in order to indicate to the user that the first treatment area Zt1 is the closest to the ground treatment tool 12.

The display and the position of the objects on the screen are updated in real time, so that a movement of the ground treatment tool 12 or of the image acquisition device 32 causes an update of the display and of the position of said objects on the screen 26.

The operator can move the ground treatment tool in the horizontal plane P with respect to the ground S and simultaneously check the screen of the augmented reality device 30 in order to visualize the evolution of the relative position of the second object with respect to the objects representative of the treatment areas. The ground treatment tool 12 can be moved until the cross of the second object $O_2'$ representative of the ground treatment tool 12 extends into the circle of the first object $O_1'$ representative of the first treatment area. In this way, the operator is guided in the movement of the ground treatment tool on the worksite for example towards the treatment area and benefits from a visual indication when the treatment tool is disposed precisely opposite the first treatment area. The treatment of the first treatment area can then be carried out.

Without departing from the framework of the present disclosure, the operator could place himself in the cabin of the machine 10. In this case, the second object $O_2'$ representative of the ground treatment tool 12 would allow him to visualize the position of said ground treatment tool, even if the latter is concealed by the mast of the machine.

In a non-limiting manner, only the objects representative of the treatment areas could be displayed.

FIG. 8 illustrates a variant of the ground treatment installation of FIG. 1. In this non-limiting example, the optical acquisition device 14 of the ground treatment assistance device 25 is mounted on the treatment machine 10. Also, the distance separating the optical acquisition device 14 and the ground treatment tool 12 remains substantially constant. The device is optionally removably mounted on the treatment machine.

As in the embodiments described above, the optical acquisition device 14 comprises for example a GPS system 18, a video camera 16 and a computer 20. It is configured to determine the positioning data Y of the ground treatment tool, for example by filming the base 12a of said ground treatment tool using the video camera. It furthermore communicates with a display device 24. In this non-limiting example, the display device 24 is disposed in the cabin of the treatment machine 10.

The invention claimed is:

1. A ground treatment assistance method comprising:
providing a machine comprising a ground treatment tool intended to be introduced into a ground;
providing geographic coordinates of at least one ground treatment area associated with a ground treatment to be carried out;
providing at least one optical acquisition device;
providing positioning data of the optical acquisition device, said positioning data comprising geographic coordinates of the optical acquisition device determined using a geolocation member;
determining positioning data of the ground treatment tool using the optical acquisition device;
providing a display device;
displaying on said display device at least a first object representative of the ground treatment tool or of said at least one ground treatment area; and
positioning on the display device said first object using the previously determined positioning data of the ground treatment tool, the positioning data of the optical acquisition device, and the geographic coordinates of said ground treatment area.

2. The ground treatment assistance method according to claim 1, wherein the position of the first object on the display device is updated in real time.

3. The ground treatment assistance method according to claim 1, wherein the positioning data of the ground treatment tool comprise at least the geographic coordinates of said ground treatment tool.

4. The ground treatment assistance method according to claim 1, wherein determining the positioning data of the ground treatment tool comprises recognizing a shape of the ground treatment tool.

5. The ground treatment assistance method according to claim 1, wherein the ground treatment tool extends along an axis, wherein the positioning data of the ground treatment tool are positioning data of said axis of the ground treatment tool, and wherein the first object is representative of the axis of the ground treatment tool.

6. The ground treatment assistance method according to claim 1, wherein the optical acquisition device is mounted on the machine, and the method comprises determining the positioning data of the optical acquisition device.

7. The ground treatment assistance method according to claim 1, wherein the positioning data of the optical acquisition device comprise an orientation and/or an inclination of said optical acquisition device.

8. The ground treatment assistance method according to claim 1, wherein at least a second object representative of the ground treatment tool is displayed on the display device if the first object is representative of the ground treatment area, or is representative of the ground treatment area if the first object is representative of the ground treatment tool.

9. The ground treatment assistance method according to claim 8, comprising moving the ground treatment tool parallel to the ground so as to position the object representative of the ground treatment tool with respect to the object representative of the ground treatment area.

10. The ground treatment assistance method according to claim 8, wherein a display on the display device is representative of a horizontal plane, the first object being representative of a vertical projection of the ground treatment tool in said horizontal plane and the second object being representative of a vertical projection of the ground treatment area in said horizontal plane.

11. The ground treatment assistance method according to claim 1, wherein the first object is representative of the ground treatment area and wherein the ground treatment assistance method comprises:
   providing at least one augmented reality device comprising said display device and an image acquisition device;
   acquiring images using the image acquisition device and displaying said images on the display device;
   determining positioning data of the image acquisition device;
   when the image acquisition device is oriented towards the ground treatment area, embedding in the images displayed on the display device said first object representative of the ground treatment area, said first object being positioned on the display device using the positioning data of the image acquisition device, so that said first object representative of the ground treatment area coincides with the ground treatment area displayed on the display device.

12. The ground treatment assistance method according to claim 1, wherein said at least one first object presents a graphical representation which depends on a state of progress of the treatment.

13. The ground treatment assistance method according to claim 1, wherein a distance between the ground treatment tool and the ground treatment area is calculated using the positioning data of the ground treatment tool and the geographic coordinates of the ground treatment area, and wherein said at least one first object presents a graphical representation which is a function of said calculated distance.

14. The ground treatment assistance method according to claim 1, wherein the ground treatment is ground drilling, in which the ground treatment tool is a drilling tool and wherein the ground treatment area is a ground drilling area.

15. The ground treatment assistance method according to claim 14, wherein the drilling tool is rotatable about an axis, wherein determining the positioning data of the drilling tool is performed while the drilling tool is being rotated about said axis, and wherein the first object is representative of the axis of the drilling tool.

16. A ground treatment assistance device, for treating ground of at least one ground treatment area associated with a treatment to be carried out on the ground, said ground treatment area having geographic coordinates, the device comprising:
   at least one optical acquisition device configured to determine positioning data of the ground treatment tool; and
   a display device configured to display at least a first object representative of the ground treatment tool or of said ground treatment area, and a second object representative of the ground treatment tool if the first object is representative of the ground treatment area, or representative of the ground treatment area if the first object is representative of the ground treatment tool;
   said first object being positioned on the display device using the determined positioning data of the ground treatment tool and the geographic coordinates of said ground treatment area.

17. The ground treatment assistance device according to claim 16, further comprising:
   a ground treatment machine comprising a ground treatment tool.

18. A ground treatment assistance method comprising:
   providing a machine comprising a ground treatment tool intended to be introduced into a ground;
   providing geographic coordinates of at least one ground treatment area associated with a ground treatment to be carried out;
   providing at least one optical acquisition device;
   determining positioning data of the ground treatment tool using the optical acquisition device;
   providing a display device;
   displaying on said display device at least a first object representative of the ground treatment tool or of said at least one ground treatment area;
   displaying on said display device a second object representative of the ground treatment if the first object is representative of the ground treatment area, or representative of the ground treatment area if the first object is representative of the ground treatment tool; and
   positioning on the display device said first object using the previously determined positioning data of the ground treatment tool and the geographic coordinates of said ground treatment area.

19. A ground treatment assistance method comprising:
   providing a machine comprising a ground treatment tool intended to be introduced into a ground;
   providing geographic coordinates of at least one ground treatment area associated with a ground treatment to be carried out;
   providing at least one optical acquisition device;
   determining positioning data of the ground treatment tool using the optical acquisition device;
   providing at least one augmented reality device comprising a display device and an image acquisition device;
   acquiring images using the image acquisition device and displaying said images on the display device;
   determining positioning data of the image acquisition device;

when the image acquisition device is oriented towards the ground treatment area, embedding in the images displayed on the display device a first object representative of the ground treatment area; and positioning on the display device said first object using the previously determined positioning data of the ground treatment tool, the geographic coordinates of said ground treatment area and the positioning data of the image acquisition device, so that said first object representative of the ground treatment area coincides with the ground treatment area displayed on the display device.

20. A ground treatment installation including:

a ground treatment machine comprising a ground treatment tool; and a ground treatment assistance device for treating ground of at least one ground treatment area associated with a treatment to be carried out on the ground, said ground treatment area having geographic coordinates, wherein the ground treatment assistance device comprises:

at least one optical acquisition device mounted on the ground treatment machine and configured to determine positioning data of the ground treatment tool; and a display device configured to display at least a first object representative of the ground treatment tool or of said ground treatment area, said first object being positioned on the display device using the determined positioning data of the ground treatment tool and the geographic coordinates of said ground treatment area.

* * * * *